Nov. 14, 1933.  C. R. ROCHE  1,934,768
BRAKE FOR AUTOMOBILES
Filed June 25, 1929
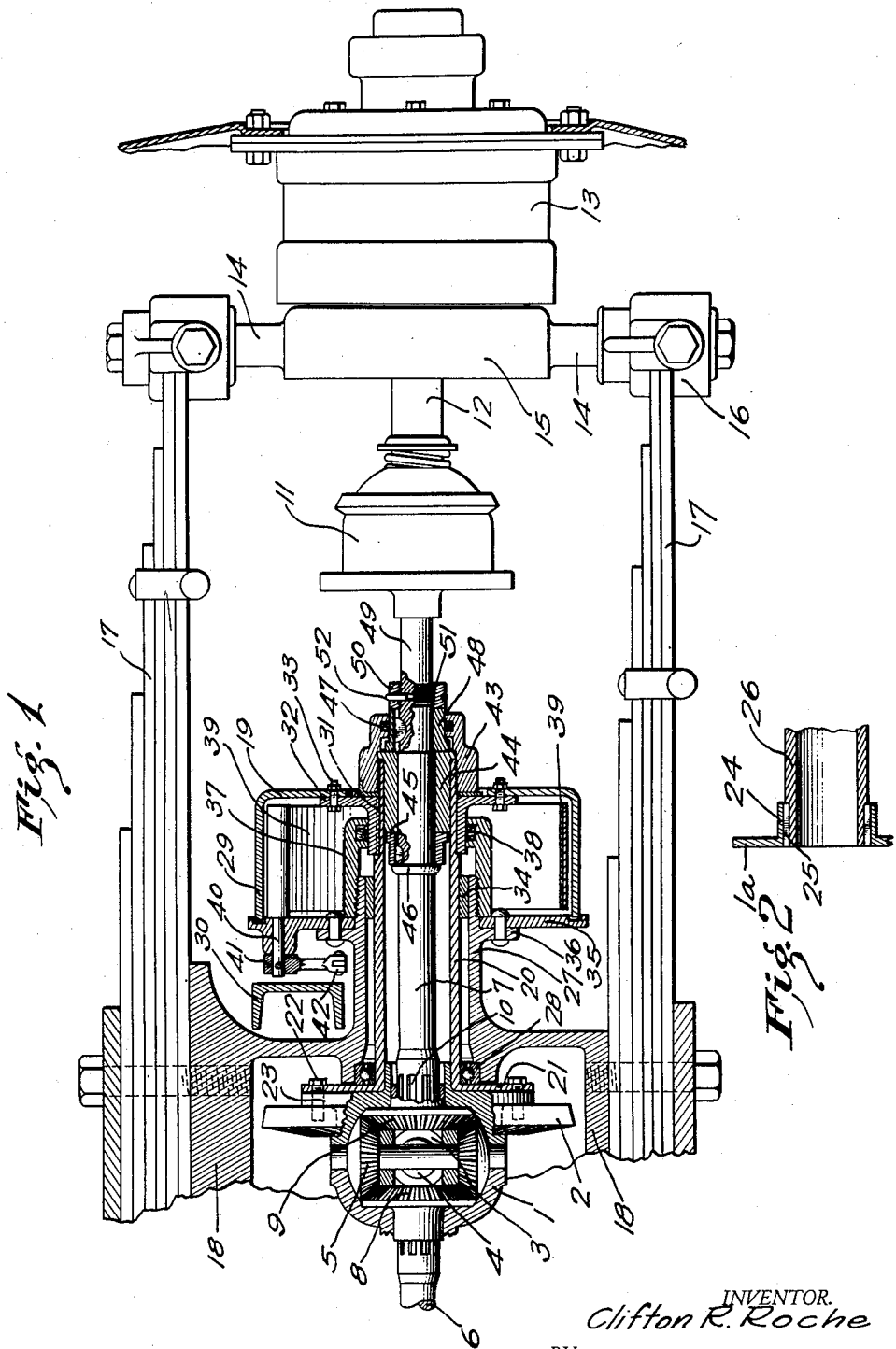
INVENTOR.
Clifton R. Roche
BY
Lyon & Lyon ATTORNEYS.

Patented Nov. 14, 1933

1,934,768

UNITED STATES PATENT OFFICE 1,934,768

BRAKE FOR AUTOMOBILES

Clifton R. Roche, Los Angeles, Calif.

Application June 25, 1929. Serial No. 373,534

3 Claims. (Cl. 188—18)

This invention relates to brakes, and while features of the invention may be applied to brakes used in any situation where a drive occurs through a differential mechanism, the invention is expected to be especially useful when applied to automobiles having a fore-wheel drive. In this type of drive, where fore-wheel brakes are employed, it has been the custom to provide these brakes on a brake drum carried on the wheel hub or on the propeller shaft. The orientation of the wheel hub in steering makes it difficult to maintain effective brake operation on the wheel, or if a propeller shaft brake is used, the speed is extremely high and there is considerable strain developed by the braking force at the pinion and ring gear, tending to wear the gears and make them noisy.

The general object of this invention is to provide a brake construction which can be readily applied on fore-wheel driven automobiles which will make it unnecessary to attach brake drums directly to the wheels; also to provide a construction whereby the brake drum can be readily applied so as to rotate with the driven wheel of the differential that carries the differential spider and the driving pinions of the differential. In relatively light automobiles, such as passenger cars, a single brake drum can be employed, but when my brake construction is applied to heavy trucks, if desired, the brake construction can be duplicated on each side of the differential, thereby greatly increasing the brake capacity of the automobile.

A further object of the invention is to provide a brake construction enabling a brake element to be readily connected to the differential spider, but located outside of the housing for the differential mechanism.

Further objects of the invention will appear hereinafter.

The invention consists in the novel parts and combination of parts to be described hereinafter, all of which contribute to produce an efficient brake for automobiles.

A preferred embodiment of the invention is described in the following specification, while the broad scope of the invention is pointed out in the appended claims.

In the drawing:

Figure 1 is a vertical section taken through the driving mechanism for one of the wheels of an automobile, showing portions of the housing broken away and other parts in elevation.

Figure 2 is a longitudinal section illustrating another embodiment of the connection which may be employed for connecting the differential spider to the brake drum.

Referring more particularly to the parts, 1 represents the differential case of the differential, which is rigid with a driven differential wheel 2 in the form of a ring rotatable by a bevel pinion 3 attached to the end of a drive shaft 4 that is driven by the engine. This differential case 1 carries the usual driving pinions 5 mounted to rotate on radial axes radiating from the intersection of the drive shaft 4 and the shafts 6 and 7 that actuate the wheels. These pinions 5 mesh with bevel gears 8 and 9 that are attached, respectively, to the shafts 6 and 7, being connected to the same by multiple splines such as indicated by the multiple spline 10 illustrated in connection with the shaft 7. Any suitable driving means, such as a worm drive or offset bevel pinion, may be employed.

The shafts 6 and 7 extend out toward each side of the car and the construction for driving each wheel is substantially the same. As illustrated in connection with the shaft 7, its outer end carries a universal driving connection 11 through which an extensible shaft 12 is rotated, said shaft being connected with the wheel hub 13 through another universal connection not illustrated, so as to permit rotation of the wheel on its axis in any position the wheel may assume in steering, or due to road shock.

In this connection it should be understood that the wheel hub is mounted for rotation on vertical shafts 14 that extend upwardly from a knuckle bracket 15 and downwardly, respectively, being mounted for rotation in ball bearings 16 carried on the ends of springs 17.

The differential mechanism is supported within the differential housing 18 to which the springs are attached.

In applying my invention to such a construction I provide a brake element, preferably in the form of a brake drum 19, which is located at the side of the housing 18 and which is connected for rotation with the differential case 1. In order to accomplish this, I provide a tubular shaft 20 that surrounds the shaft 7 and the inner end of this tubular shaft 20 is connected in any suitable manner to the driven differential wheel 2, or to the differential case 1. As illustrated in Figure 1, the inner end of the tubular shaft 20 is provided with, or formed with a rigid flange or collar 21 which may be secured by bolts 22 to a flange 23 on the differential case 1, which also may be used as a mounting for the bevel gear 2. Instead of forming this connection in this way, however, I may provide a construction such as that illustrated in Figure 2, in which the differential case 1ª or an element attached to the differential case is provided with a projecting hub 24, which is connected by a multiple spline connection 25 with a tubular shaft 26.

The differential housing 18 is provided with the usual outwardly extending tubular extension 27, which is of considerably larger diameter than the tubular shaft 20, and the inner end of this tubular extension may be provided with a ball bearing 28 to support the differential case 1.

The tubular shaft 20 extends beyond the end of the tubular extension 27, as illustrated, and the flange 29 of the brake drum 19 preferably projects inwardly toward the automobile frame 30, that is to say, toward the longitudinal central axis of the car. The outer end of the tubular shaft 20 has a multiple spline connection 31 that connects it to the drum 19. For this purpose I prefer to employ a collar 32 with a tubular neck to receive the spline grooves and connect this collar to the drum 19 bolts 33. This construction facilitates forming the drum 19 out of sheet metal and enables a standard drum to be employed.

The outer end of the tubular extension 27 is provided with a bushing or bearing 34 which centers the tubular shaft 20. If desired, this bushing may be in the form of a ball bearing. The housing 18 is attached in some suitable way to the frame 30.

Near the end of the tubular extension 27, I provide a cover plate or dust plate 35 for the brake drum which may be riveted to an outwardly projecting flange 36 formed on the tubular extension. Beyond this point a dust cap 37 is provided that screws onto the threaded end of the tubular extension 27 and is provided with a packing ring or dust ring 38 of packing material that slips over the outer side of the neck of the hub 32. This packing 38 assists in keeping dust from the road from passing into the driving mechanism associated with the shaft 7.

Any suitable brake applying means may be provided for applying a braking force to the drum 19. In the present instance, I have illustrated an internally expansible brake band 39 actuated by a rotatable pin 40 carrying a rigid actuating arm 41 to which a brake link 42 is attached.

In addition to the dust ring 38, I provide an outside dust cap 43 that screws onto the threaded outer end of the tubular shaft 20, operating to retain the bushing 44. This bushing acts as a bearing for the shaft 7 which it holds in place by the collar 45, which is pressed against an integral collar or shoulder 46 formed on the shaft 7.

This dust cap 43 carries a packing ring or dust ring 47 that receives a slip bushing 48 that slides over the outer reduced portion 49 of the shaft 7 and seats against the outer end of the bushing 44. This slip collar or bushing 48 may be secured in place by a collar 50 received on upset thread 51 on the outer end of the shaft 7 and locked in place by wire 52 with its end projecting into a hole in the shaft.

The mode of operation of the mechanism will now be briefly described.

The drive from the engine comes through the shaft 4 and rotates the driving pinion 3 that is attached to it. This pinion 3 meshes with the teeth of the driven bevel wheel 2 that is mounted on the differential case 1. The pinions 5 carried by the differential case impart the rotation of the differential case to the shafts 6 and 7 in the usual manner in differentials. As the differential case 1 and the driven bevel gear 2 rotate, they impart their rotation to the tubular shaft 20 and to the brake drum 19 which it carries. The brake means for applying braking force to the drum is carried on the cover plate 35 for the drum and is applied in the usual way by rotating a shaft or pin 40 connected with the brake band 39 on the inside of the drum.

It will be evident that one of the advantages of my invention lies in the fact that the position in which the brake drum is located gives ample space so that the drum may be made as wide as desired. This is especially desirable in brake constructions for trucks, the designers of which have considerable difficulty in finding space for providing a sufficient braking area to insure quick stopping of the truck. Furthermore, it will be evident that the brake drum construction and tubular shaft 20 can be duplicated, if desired, on the other side of the car, thereby increasing the braking capacity if desired. This adaptation is particularly advantageous for trucks, giving a relatively large brake area.

It is to be understood that the embodiment of the invention described herein is only one of the many embodiments this invention may take, and I do not wish to be limited in the practice of the invention, nor in the claims, to the particular embodiment set forth.

What I claim is:

1. In a brake construction for automobiles, the combination of a frame, wheel supporting the same, a differential housing supported on the frame and having a side wall with an integral tubular extension projecting toward the side of the automobile, differential driving mechanism mounted within the differential housing and including a driven differential wheel, differential pinions carried thereby, a shaft driven through the pinions for driving the adjacent automobile wheel and extending through the said tubular extension of the housing, a brake drum mounted to rotate with the differential wheel located beyond the tubular extension of the housing, and at a distance from said frame member, a cover plate for the brake drum carried on the tubular extension of the housing, and a brake actuating arm mounted on the cover plate and between the same and said frame member to apply a braking force to the brake drum.

2. In a brake construction for automobiles, the combination of a frame, a differential housing supported on the frame and having a side wall with an integral tubular extension projecting toward the side of the automobile, said tubular extension having a flange adjacent its outer end, differential driving mechanism mounted within the differential housing and including a driven differential wheel, differential pinions carried thereby, a shaft carried by the driven differential wheel and extending through the said tubular extension of the housing, a brake drum mounted on the said shaft and fixed against relative rotation on the same, located beyond the tubular extension of the housing, a cover plate for the brake drum secured to said flange and a brake arm supported on the cover plate to cooperate with the same to apply the braking force.

3. In a brake construction for automobiles, the combination of a frame, a differential housing supported on the frame and having a side wall with an integral tubular extension projecting toward the side of the automobile, differential driving mechanism mounted within the differential housing and including a driven differential wheel, differential pinions carried thereby, an inner shaft driven through the differential pinions for driving the automobile wheels, and an outer tubular shaft surrounding the same and connected rigidly with the said differential wheel to rotate therewith, a single brake element corresponding to both the said wheels mounted on the outer shaft and fixed against relative rotation on the same, located beyond the tubular extension of the housing so as to leave a space between the upper portion of the brake element and the side wall of said housing, a cover plate for the brake element fixed on the tubular extension, and a brake arm supported on the cover plate and located in said space between the cover plate and said side wall to cooperate with the said brake element to apply braking force to the same.

CLIFTON R. ROCHE.